(12) United States Patent
Freitag et al.

(10) Patent No.: US 7,779,660 B2
(45) Date of Patent: Aug. 24, 2010

(54) PROCEDURE FOR DEEP ROLLING CRANKSHAFTS

(75) Inventors: Ralf Freitag, Grevenbroich (DE); Roland Heffe, Korschenbroich (DE); Alfred Heimann, Aachen (DE); Theo Nijssen, Beesel (NL); Frank Risters, Erkelenz (DE); Juergen Winnertz, Erkelenz (DE)

(73) Assignee: Hegenscheidt-MFD GmbH & Co. KG (DE)

( * ) Notice: Subject to any disclaimer, the term of this patent is extended or adjusted under 35 U.S.C. 154(b) by 318 days.

(21) Appl. No.: 11/886,683

(22) PCT Filed: Feb. 1, 2006

(86) PCT No.: PCT/EP2006/050598
§ 371 (c)(1),
(2), (4) Date: Dec. 7, 2007

(87) PCT Pub. No.: WO2006/100149
PCT Pub. Date: Sep. 28, 2006

(65) Prior Publication Data
US 2008/0196465 A1 Aug. 21, 2008

(30) Foreign Application Priority Data
Mar. 24, 2005 (DE) .................. 10 2005 013 637

(51) Int. Cl.
*B21B 37/58* (2006.01)
(52) U.S. Cl. .......................... 72/10.4; 72/17.2; 72/21.4; 72/110
(58) Field of Classification Search .................. 72/10.4, 72/10.6, 10.7, 14.4, 14.5, 17.1, 17.2, 20.1, 72/20.2, 21.1, 21.4, 21.5, 107, 110, 10.1
See application file for complete search history.

(56) References Cited

U.S. PATENT DOCUMENTS 3,464,247 A * 9/1969 Beckwell .................. 72/37
4,870,845 A 10/1989 Nakagawa et al.

(Continued)

FOREIGN PATENT DOCUMENTS

DE 36 25 961 A1 3/1987

(Continued)

*Primary Examiner*—Edward Tolan
(74) *Attorney, Agent, or Firm*—Harness, Dickey & Pierce, P.L.C.

(57) ABSTRACT

The invention relates to a method for deep rolling the passes or radii on the transitions between journal and cheeks or flanges of crankshafts by means of a deep rolling device (1) of a deep rolling machine, said deep rolling device having a lazy tongs-type design. The deep rolling device (1) has two tongs arms (2, 3) that are articulated to each other via a pivot joint (24). The corresponding outer ends (4, 5, 9, 10) of the tongs arms (2, 3) are provided with a deep rolling tool (6) or a force generator (11) for generating the deep rolling force. A measuring tape (18) and a sensor (19) which are provided on the pivot joint (24) are used to measure the impression depth of the deep rolling rollers (12) under the effect of the deep rolling force. A measuring device (22) mounted on the exterior (21) of a tongs arm (2) is used to measure the degree by which the tongs arm (2) bends under the effect of the deep rolling force.

10 Claims, 1 Drawing Sheet

U.S. PATENT DOCUMENTS

| | | | |
|---|---|---|---|
| 5,168,736 A * | 12/1992 | Enneper et al. | 72/4 |
| 5,235,838 A * | 8/1993 | Berstein | 148/510 |
| 6,666,061 B2 * | 12/2003 | Heimann | 72/110 |
| 6,895,793 B2 * | 5/2005 | Heffron et al. | 72/110 |
| 2002/0083751 A1 | 7/2002 | Heffron et al. | |
| 2002/0189312 A1 | 12/2002 | Heimann | |
| 2005/0145000 A1 | 7/2005 | Heffron et al. | |

FOREIGN PATENT DOCUMENTS

| | | |
|---|---|---|
| DE | 195 11 882 A1 | 10/1996 |
| EP | 1 262 280 A | 12/2002 |

* cited by examiner

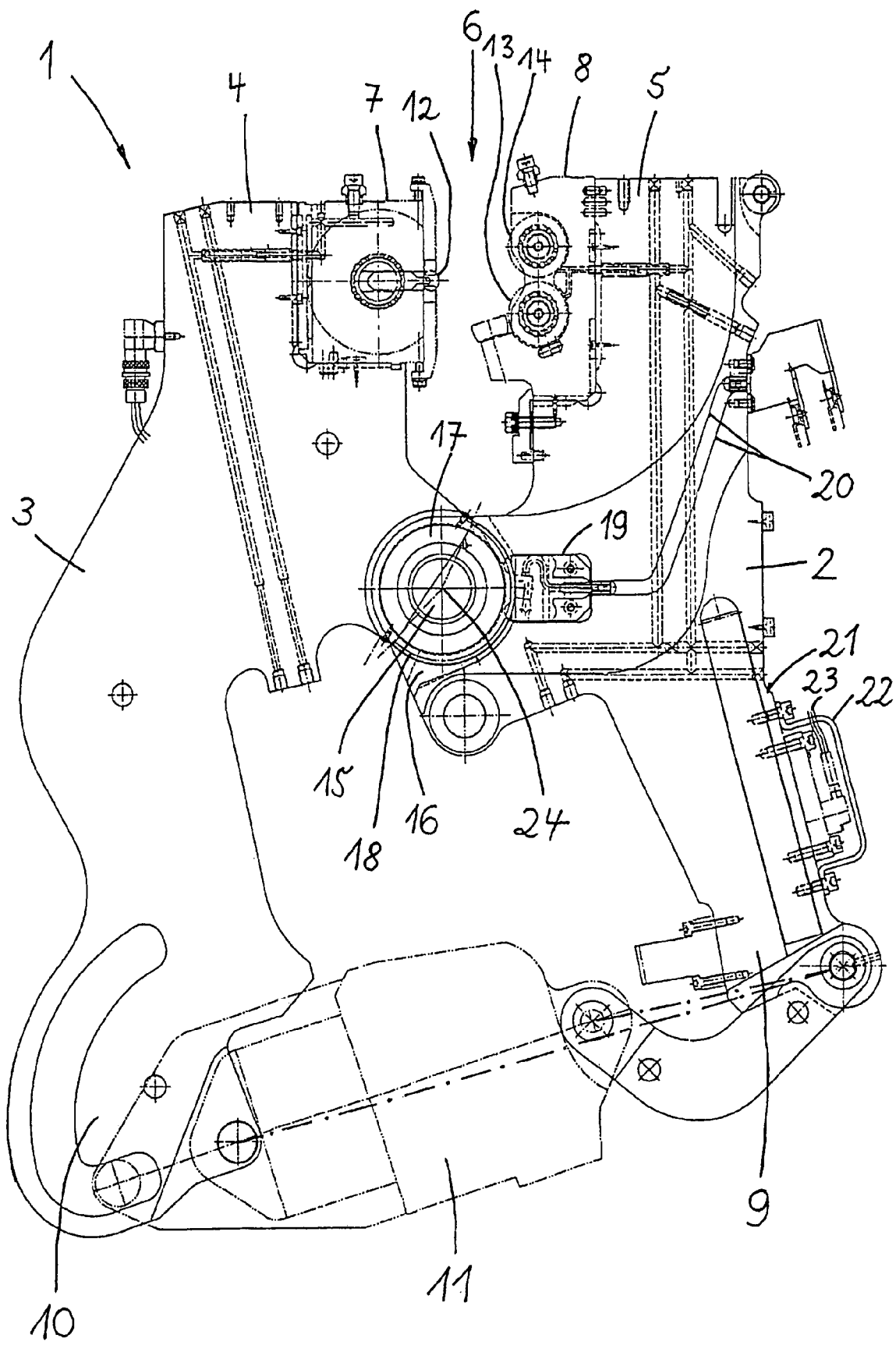

PROCEDURE FOR DEEP ROLLING CRANKSHAFTS

CROSS-REFERENCE TO RELATED APPLICATIONS

This application is a 371 National Stage of International application No. PCT/EP2006/050598, filed Feb. 1, 2006. This application claims the benefit of DE 10 2005 013 637.0, filed Mar. 24, 2005. The disclosure(s) of the above applications are incorporated herein by reference.

The invention concerns a procedure for deep rolling the recesses or radii on the transitions between bearing trunnions and webs or flanges of crankshafts using a shear-type construction deep rolling unit of a deep rolling machine with two shearing arms which are connected with articulation to one another by a rotating joint. A deep rolling head and a support roller head are arranged on the respective reciprocal outer ends of the shearing arms as parts of a deep rolling tool or a power unit to generate the deep rolling force.

A comparable procedure for hardening workpiece surfaces is known, for example, from DE 195 11 882 B4. According to this, a procedure for hardening workpiece surfaces by generating internal pressure stress using deforming tools and measuring the workpiece surface is known, whereby the workpiece surface is measured during the hardening process and controlled variables for setting/altering workpiece parameters are derived from the measurement results. At the same time, a device on a deep rolling unit whereby a pneumatic sensing head is spring-stored in the deep rolling tool, which is arranged diametrally opposite the deep roller is known.

The disadvantage of the known procedure and the device designed for it is that the surface contour is measured at a point on the workpiece, here the crankshaft, in the immediate vicinity of which the parts of the deep rolling tool are operative. It is difficult to attach an additional measuring device within the narrow dimensions of a deep rolling tool. A tool located there is particularly subject to the risk of contamination. Finally, it is much more accurate and direct to determine the effect of the deep rolling tool directly on the workpiece and not the long way round using pneumatic media.

As a result, it is the task of the present invention to propose a procedure and a device for measuring both the engaging depth of the deep rollers in the recesses or radii of the crankshaft to be deep rolled and also the deep rolling force which is necessary for the penetration of the deep rollers in the radii or recesses.

In accordance with the invention, this problem is solved by measuring the engaging depth of the deep rollers in the recesses or radii subject to the deep rolling force by measuring the reciprocal position which the two shearing arms momentarily occupy at the rotating joint. Thus, the point at which the engaging depth is measured is sufficiently far away from the place where the penetration takes place to prevent contamination, without affecting the deep rolling unit's available space.

In contrast, the deep rolling force is measured by measuring the deflection of one of the two shearing arms subjected to the deep rolling force between the outer end which the power unit is attached to and the rotating joint. With this arrangement, the space available for the deep rolling unit in the deep rolling machine is optimally used and at the same time, easy accessibility to the measuring location is maintained. Thanks to the high resolution of modern measuring devices, the measured values obtained are very precise and free from any other influences from the machine.

The measured values of the engaging depth and the deep rolling force are fed to a common evaluation station and converted into controlled variables, either for the engaging depth or for the deep rolling force, by means of which the entire deep rolling process can be controlled very accurately.

A device for measuring the engaging depth includes, on the rotating joint, a measuring tape belonging to one of the two shearing arms and a sensor belonging to the other shearing arm which measures the respective position of the measuring tape.

To measure the deep rolling force, a wire strain gauge is attached to one of the two long sides of a shearing arm, which measures the deflection of the shearing arm when subjected to the deep rolling force.

The following section describes the invention with a design example.

The FIGURE shows a side view of the basic parts of a deep rolling device, on a reduced scale.

The deep rolling unit (1) is designed in shear-type construction. It consists of the two shearing arms (2 and 3), which are connected to one other with articulation via a rotating joint (24). The deep rolling tool (6) and its parts, the deep rolling head (7) and support roller head (8), are arranged between the first two related outer ends (4 and 5) of the shearing arms (2 and 3).

The power unit (11) for generating the deep rolling force between the deep rolling head (7) and the support roller head (8) is located between the second outer ends (9 and 10) of the two shearing arms (2 and 3). Subject to the force of the power unit (11), deep rollers (12) penetrate the recesses or radii on the bearing trunnions of crankshafts (not shown), which are supported opposite the deep rollers (12) by the two support rollers (13 and 14). The relevant expert will be sufficiently aware of this procedure, rendering a more detailed description unnecessary.

The rotating joint (24) is formed by a bolt (15), which is surrounded by the eyes (16 and 17) of one of the two shearing arms (2 and 3). A measuring tape (18) is arranged on the outer circumference of the eye (17), which includes a large section of the outer circumference of the eye (17). A sensor (19) which determines the respective position of the measuring tape (18) and thus the position of the two shearing arms (2 and 3) to one another and transfers an evaluation unit via connections (20) (not shown) is on the shearing arm (2). The measuring resolution of this arrangement is sufficiently high so as to very accurately determine the engaging depth of the deep rollers, which lies in the region between 0.1 and 0.01 mm.

A further measuring device (22) is on the exterior side (21) of the second outer end (9) of the shearing arm (2). Wire strain gauges are arranged in the interior of the measuring device (22) (not shown), which are attached to the surface of the exterior side (21). The second outer end of the shearing arm (2) is deflected when subjected to the deep rolling force of the power unit (11). This deflection is proportional to the level of the deep rolling force. By measuring the deflection with the measuring device (22), a measuring value is obtained which corresponds to the level of the deep rolling force. The measuring device (22) is also connected to the above-mentioned evaluation and control station via connections (23).

The invention claimed is:

1. A method for deep rolling the recesses or radii on the transitions between bearing trunnions and webs or flanges of crankshafts using a shear-type construction deep rolling unit of a deep rolling machine with two shearing arms which are connected at a rotating joint with articulation to one another comprising:

arranging a deep rolling head and a support roller head as parts of a deep rolling tool and a power unit;

generating a deep rolling force, via said power unit, on respective reciprocal outer ends of the shearing arms;

measuring a reciprocal position that the two shearing arms momentarily occupy at the rotating joint; and simultaneously measuring an engaging depth of the deep rollers in the recesses or radii subject to the deep rolling force by while measuring the reciprocal position of the two shearing arms.

2. The method according to claim 1, further comprising simultaneously measuring the engaging depth and the deep rolling force.

3. The method according to claim 1, further comprising regulating the deep rolling force using the measured engaging depth.

4. A device for implementing the procedure according to claim 1 comprising a measuring tape belonging to one of the two shearing arms and a sensor belonging to the other shearing arm which measures the respective position of the measuring tape on the rotating joint.

5. The device according to claim 4, wherein the measured values of the engaging depth and the deep rolling force are fed to a common evaluation station which monitors and controls the deep rolling process.

6. A method for deep rolling the recesses or radii on the transitions between bearing trunnions and webs or flanges of crankshafts using a shear-type construction deep rolling unit of a deep rolling machine with two shearing arms which are connected at a rotating joint with articulation to one another comprising:

arranging a deep rolling head and a support roller head as parts of a deep rolling tool and a power unit;

generating a deep rolling force, via said power unit, on respective reciprocal outer ends of the shearing arms; and measuring deflection of one of the two shearing arms subject to the deep rolling force between its outer end, that is attached to the power unit, and the rotating joint; and determining an engaging depth of the deep rollers.

7. The method according to claim 6, further comprising regulating the engaging depth using the measured deep rolling force.

8. A device for implementing the procedure according to claim 6 comprising a wire strain gauge on one of the two long sides of a shearing arm for measuring the deflection.

9. The device according to claim 8, wherein the measured values of the engaging depth and the deep rolling force are fed to a common evaluation station which monitors and controls the deep rolling process.

10. The method according to claim 6, further comprising simultaneously measuring the engaging depth and the deep rolling force.

* * * * *

UNITED STATES PATENT AND TRADEMARK OFFICE
CERTIFICATE OF CORRECTION

PATENT NO.        : 7,779,660 B2                                            Page 1 of 1
APPLICATION NO.   : 11/886683
DATED             : August 24, 2010
INVENTOR(S)       : Ralf Freitag et al.

It is certified that error appears in the above-identified patent and that said Letters Patent is hereby corrected as shown below:

Column 3
Claim 1, Line 9 after "force", delete "by"

Signed and Sealed this

Sixteenth Day of November, 2010

David J. Kappos
*Director of the United States Patent and Trademark Office*